United States Patent [19]
Morando

[11] 3,881,405
[45] May 6, 1975

[54] ENERGY SOURCE FOR GENERATING AN ELECTROMAGNETIC FLUX

[76] Inventor: Beniamino P. Morando, Edificio Manaure, Oficinia 52, Piso 5, Sabana Grande, Caracas, Venezuela

[22] Filed: Mar. 6, 1973

[21] Appl. No.: 338,588

[52] U.S. Cl. .................................. 99/452; 426/247
[51] Int. Cl. ............................................. A23c 19/00
[58] Field of Search ...... 99/DIG. 14, 452, 453, 483; 21/221, 54 R; 219/119, 201, 310, 311, 358, 482, 10.57, 10.81; 426/237–247; 331/182, 183

[56] References Cited
UNITED STATES PATENTS

| | | | |
|---|---|---|---|
| 1,181,219 | 5/1916 | Goucher | 426/247 |
| 2,550,584 | 4/1951 | Mittelmann | 426/247 |
| 2,979,411 | 4/1961 | Pircon | 219/10.57 |

*Primary Examiner*—Leonard D. Christian

[57] ABSTRACT

This is an energy source for generating an electromagnetic flux which is especially useful in applying a high voltage and relatively high frequency for various applications. In the particular disclosed embodiment, the energy source is used to apply a high voltage and relatively high frequency to milk located in a metal container for the purpose of aiding in the development of an improved milk or milk base product that can be preserved for long periods of time.

15 Claims, 2 Drawing Figures

PATENTED MAY 6 1975    3,881,405

OUTPUT VOLTAGE WAVEFORM

ENERGY SOURCE FOR GENERATING AN ELECTROMAGNETIC FLUX

CROSS REFERENCE TO RELATED APPLICATIONS AND/OR PATENTS

Beniamino P. Morando, "Improved Milk Base Product and Apparatus for the Production Thereof", application Ser. No. 338,586, filed on Mar. 6, 1973.

BACKGROUND OF THE INVENTION

1. Field of the Invention

This invention relates generally to energy sources for generating an electromagnetic flux having a high voltage and relatively high frequency, and, more particularly, to energy sources especially applicable to apply a high voltage and relatively high frequency to milk located in a metal container for the purpose of aiding in the development of an improved milk or milk base product that can be preserved for long periods of time.

2. Description of the Prior Art

In the past, various attempts have been made to develop milk or milk base products which would retain all or substantially all of its whey and that can also be preserved for long periods of time. The prior art developments employed heating techniques, chemical processes, etc.

A need existed to develop a reliable technique for making a milk or milk base product which retained all or substantially all its whey and could be preserved for long periods of time. The energy source device disclosed herein is especially useful in the apparatus disclosed in my copending patent application entitled "Improved Milk Base Product And Apparatus for the Production Thereof" filed simultaneously with the filing of this patent application.

SUMMARY OF THE INVENTION

It is an object of this invention to provide an energy source for generating an electromagnetic flux having a high voltage and a relatively high frequency.

It is a further object of this invention to provide an energy source for generating an electromagnetic flux having a high voltage and a relatively high frequency to milk located in a metal container for the purpose of aiding in the development of an improved milk or milk base product that can be preserved for long periods of time.

DESCRIPTION OF THE PREFERRED EMBODIMENTS

In accordance with an embodiment of this invention, an energy source for providing an electromagnetic flux having a high voltage and a relatively high frequency is disclosed. The energy source comprises variable frequency generator means having input and output terminals for receiving an input voltage and frequency. Connected to the output terminals of the variable generator means is a load means. Power transformer means are provided having a primary winding connected to the load means and a secondary winding for generating a high output voltage. Adjustable capacitor means are connected to the secondary winding of the power transformer means for adjusting the amplitude of the output signal of the energy source.

The foregoing and other objects, features and advantages of the invention will be apparent from the following more particular description of the preferred embodiments of the invention as illustrated in the accompanying drawings.

BRIEF DESCRIPTION OF THE FIGURES

Referring to FIG. 1, the energy source 22 is shown within the dotted box labelled 22 and this energy source is used in the embodiments disclosed in FIGS. 1, 2 and 3 of the above identified copending patent application. The energy source 22 comprises a variable frequency generator 46 which is a device commonly used in the electronic arts for varying the line frequency introduced at the input end of the generator 46 to a higher frequency at the output of the frequency generator 46. The variable frequency generator 46 of this invention is of the type that will generate a variable frequency from 0 to 5,000 Hertz and a variable voltage from 0 up to 120 volts.

Figure 1:
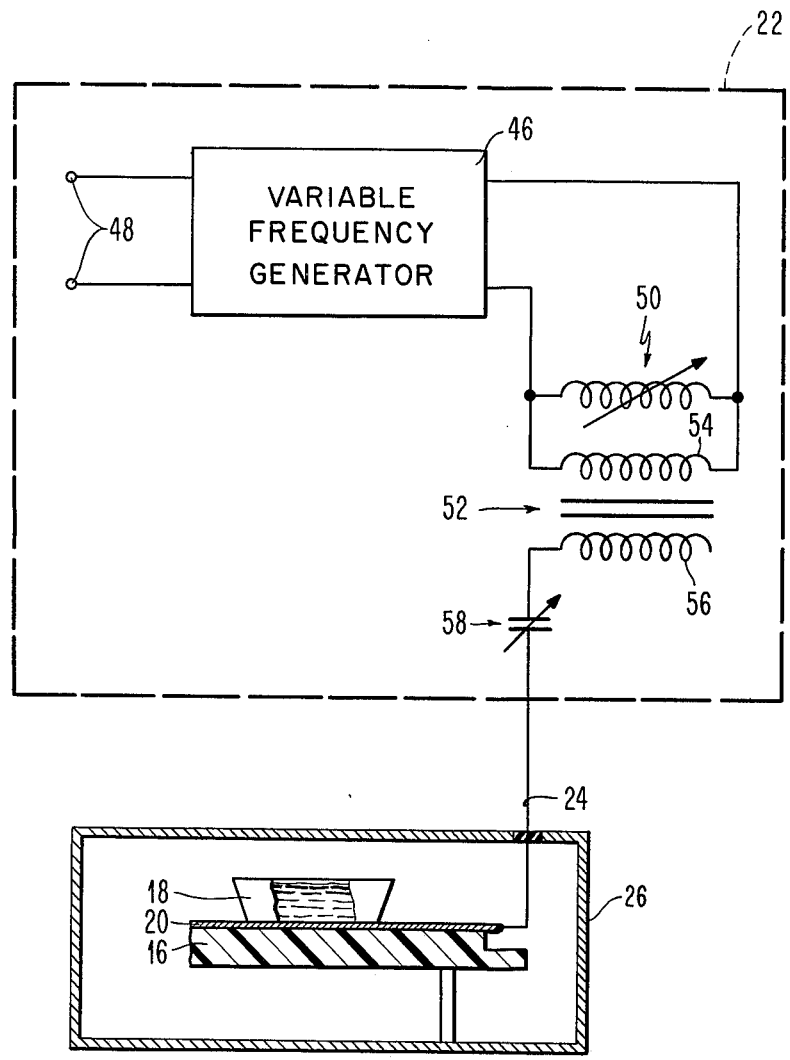
FIG. 1 is a view showing the electrical schematic of the energy source of this invention used to assist in the formation of a milk or milk base product having the characteristics described above.

In the specific embodiment disclosed herein, a voltage of 120 volts and a frequency of 60 Hertz is applied to the input terminals 48 of the variable frequency generator 46. The output from the variable frequency generator 46 is 100 volts at a frequency of 1660 Hertz. A variable inductance 50 is connected as a load at the output of the variable frequency generator 46. The variable inductance 50 is, for example, five coils connected together in series with the DC resistance of each coil being 60,000 Ohms and the dimensions of each coil being 1½ inches in diameter and 4 inches long. Thus, the variable inductance element 50 provides a load or total impedance in the circuit having a value of 300,000 Ohms.

A power transformer generally designated by reference numeral 52 is electrically connected to the variable inductance 50. The power transformer 52 has a primary winding 54 and a secondary winding 56. The power transformer 52 is preferably a conventional 60 cycle power tranformer and can be of the type used to operate gaseous tubes. The primary winding is designated for an input of 120 volts and 190 volt amps. The secondary winding 56 is designed to generate an output of 6,000 volts and a current of 30 miliamps.

In the actual embodiment disclosed herein, the primary winding 54 of the power transformer 52 receives an input voltage of 100 volts at a frequency of 1660 Hertz and the secondary winding 56 of the power transformer 52 provides an output of 1300 volts at a frequency of 1660 Hertz.

An adjustable capacitor 58 is connected in series with the secondary winding 56 of the power transformer 52. Due to the variable capacitor 58, the output voltage that is generated by means of the conductor 24 to a metal or aluminum foil 20 is approximately 600 volts and the frequency of the energy flux applied to the metal foil 20 is 1660 Hertz. The adjustable capacitor 58 is the final element of the energy source 22. The adjustable capacitor 58 is preferably constructed by the use of two polyester sheets (about 1.5 inches square each) which are alternated with copper sheets of one-tenth of a milimeter of thickness which in turn are connected to a plurality of output contacts. The adjustable capacitor 58 is used to adjust the amplitude of the signal at the metal or aluminum foil 20 to which a conductor 24 is connected. Approximately 10 feet of the wire 24 is used to connect the energy source 22 to the metal foil 20.

Figure 1A:
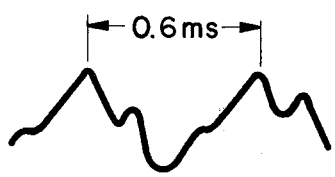
FIG. 1A is a waveform of the output voltage generated by the energy source disclosed in FIG. 1.

FIG. 1A illustrates the output voltage waveform that is generated by the energy source 22 and which is applied by means of the conductor 24 to the metal or aluminum foil 20. There is approximately a time period of 0.6 miliseconds between the repetitive peaks of the generated waveform at the aluminum foil 20.

It is believed that the energy source 22 generates an electromagnetic field which radiates energy through the milk located in the containers 18 to enhance the fabrication process to produce the improved, long lasting milk product. This radiated energy is subsequently returned to ground by means of a path going through the air to the closest metal object in contact with the ground such as element 26. In the disclosed embodiment, the single conductor 24 applies a high voltage and relative high frequency to the milk contained in the metal containers 18 and, if desired, the frequency is varied to different optimized levels depending upon the configuration of the container and the quantity of milk located therein. In this specific embodiment, each of the metal containers is approximately 6 inches in depth and the width and length can be varied as desired. The voltage amplitude is also varied depending upon the quantity of the milk that is used and the dimensions or geometry of the metal container 18.

While the invention has been particularly shown and described with reference to preferred embodiments thereof, it will be understood by those skilled in the art that the foregoing and other changes in the form and details may be made therein without departing from the spirit and scope of the invention.

I claim:

1. An energy source for providing an electromagnetic flux having a high voltage and a relatively high frequency comprising, in combination, variable frequency generator means having input and output terminals for receiving an input voltage and frequency and for generating a different output voltage and frequency; load means connected to the output terminals of said variable frequency generator means; power transformer means having a primary winding connected to said load means and having a secondary winding for generating a high output voltage; and adjustable capacitor means connected to said secondary winding of said power transformer means for adjusting the amplitude of the output signal of said energy source.

2. An energy source in accordance with claim 1 wherein said variable frequency generator means having means for generating an output of 100 volts at a frequency of 1660 Hertz.

3. An energy source in accordance with claim 1 wherein said load means comprising a variable inductance having a total impedance value of 300,000 Ohms.

4. An energy source in accordance with claim 1 wherein said secondary winding of said power transformer means generates an output of 1300 volts at a frequency of 1600 Hertz.

5. An energy source in accordance with claim 1 wherein said adjustable capacitor means having means for generating an output from said energy source of approximately 600 volts at a frequency of 1660 Hertz.

6. An energy source in accordance with claim 1 wherein
said variable frequency generator means having means for generating an output of 100 volts at a frequency of 1660 Hertz;
said load means comprising a variable inductance having a total impedance value of 300,000 Ohms;
said secondary winding of said power transformer means generates an output of 1300 volts at a frequency of 1600 Hertz; and
said adjustable capacitor means having means for generating an output from said energy source of approximately 600 volts at a frequency of 1660 Hertz.

7. An energy source for providing an electromagnetic flux having a high voltage and a relatively high frequency to milk, comprising a metal container having milk located therein comprising, in combination, variable frequency generator means having input and output terminals for receiving an input voltage and frequency and for generating a different output voltage and frequency; load means connected to the output terminals of said variable frequency generator means; power transformer means having a primary winding connected to said load means and having a secondary winding for generating a high output voltage; and adjustable capacitor means connected to said secondary winding of said power transformer means for adjusting the amplitude of the output signal of said energy source, a conductive lead connecting said adjustable capacitor means to said metal container.

8. An energy source in accordance with claim 7 wherein said variable frequency generator means having means for generating an output of 100 volts at a frequency of 1660 Hertz.

9. An energy source in accordance with claim 7 wherein said load means comprising a variable inductance having a total impedance value of 300,000 Ohms.

10. An energy source in accordance with claim 7 wherein said secondary winding of said power transformer means generates an output of 1300 volts at a frequency of 1600 Hertz.

11. An energy source in accordance with claim 7 wherein said adjustable capacitor means having means for generating an output from said energy source of approximately 600 volts at a frequency of 1660 Hertz.

12. An energy source in accordance with claim 7 wherein
said variable frequency generator means having means for generating an output of 100 volts at a frequency of 1660 Hertz;
said load means comprising a variable inductance having a total impedance value of 300,000 Ohms;
said secondary winding of said power transformer means generates an output of 1300 volts at a frequency of 1600 Hertz; and
said adjustable capacitor means having means for generating an output from said energy source of approximately 600 volts at a frequency of 1660 Hertz.

13. An energy source for providing an electromagnetic flux having a high voltage and a relatively high frequency to milk comprising, in combination, a metal container having milk located therein, and energy source means electrically connected to said metal container for applying to said milk located within said container a high voltage and a relatively high frequency to assist in the preparation of a milk base that can be preserved for long periods of time.

14. An energy source in accordance with claim 13 wherein said energy source means having means for generating an output of 600 volts at a frequency of 1660 Hertz.

15. An energy source in accordance with claim 14 wherein said metal container has a depth of 6 inches.

* * * * *